United States Patent [19]
Shelton

[11] Patent Number: 6,032,447
[45] Date of Patent: Mar. 7, 2000

[54] GARDENING TOOL

[76] Inventor: Aaron J. Shelton, 1766 N. Sierra Bonita Ave., Pasadena, Calif. 91104

[21] Appl. No.: 08/932,664

[22] Filed: Sep. 18, 1997

Related U.S. Application Data

[60] Provisional application No. 60/026,339, Sep. 19, 1996.

[51] Int. Cl.[7] .................................................. A01D 7/00
[52] U.S. Cl. .................................. 56/400.04; 56/400.17; 15/176.6; 15/246; 7/114
[58] Field of Search ........................... 56/400.01, 400.04, 56/400.05, 400.06, 400.17, 400.19, 400.21; 15/105, 176.1, 176.6, 246; 7/114

[56] References Cited

U.S. PATENT DOCUMENTS

| | | | |
|---|---|---|---|
| 1,850,318 | 3/1932 | Drotos et al. | |
| 2,477,876 | 8/1949 | Jaffa . | |
| 3,082,455 | 3/1963 | Evancha . | |
| 3,084,498 | 4/1963 | Straley . | |
| 3,668,850 | 6/1972 | Horkey | 56/400.04 |
| 3,855,766 | 12/1974 | Lutz | 56/400.18 |
| 4,189,908 | 2/1980 | Brock, Jr. | 56/400.17 |
| 4,244,168 | 1/1981 | Howard | 56/400.17 |
| 4,741,149 | 5/1988 | Vom Braucke et al. | 56/400.04 |
| 5,343,684 | 9/1994 | Siler, III | 56/400.08 |

FOREIGN PATENT DOCUMENTS

| | | | |
|---|---|---|---|
| 633557 | 7/1936 | Germany | 15/105 |

*Primary Examiner*—H. Shackelford
*Attorney, Agent, or Firm*—Christie, Parker & Hale, LLP

[57] ABSTRACT

A detachable broom head is provided for quick and easy attachment to a lawn and garden rake. The broom head is adapted to be removably mounted on the rake such that a dual purpose lawn and garden tool is created. In one orientation the tool functions as an ordinary lawn and garden rake. In a second orientation the tool functions as a broom. Therefore, it is possible to use a single lawn and garden tool for tasks that require both raking and brooming. Additionally, the broom head may be attached to the rake so that the bristles of the broom do not interfere with the normal operation of the rake. In one embodiment, a pair of attachment clips are provided on the broom head to grip the rake frame. In another embodiment, a coupler is provided to attach the broom head to the rake.

16 Claims, 10 Drawing Sheets

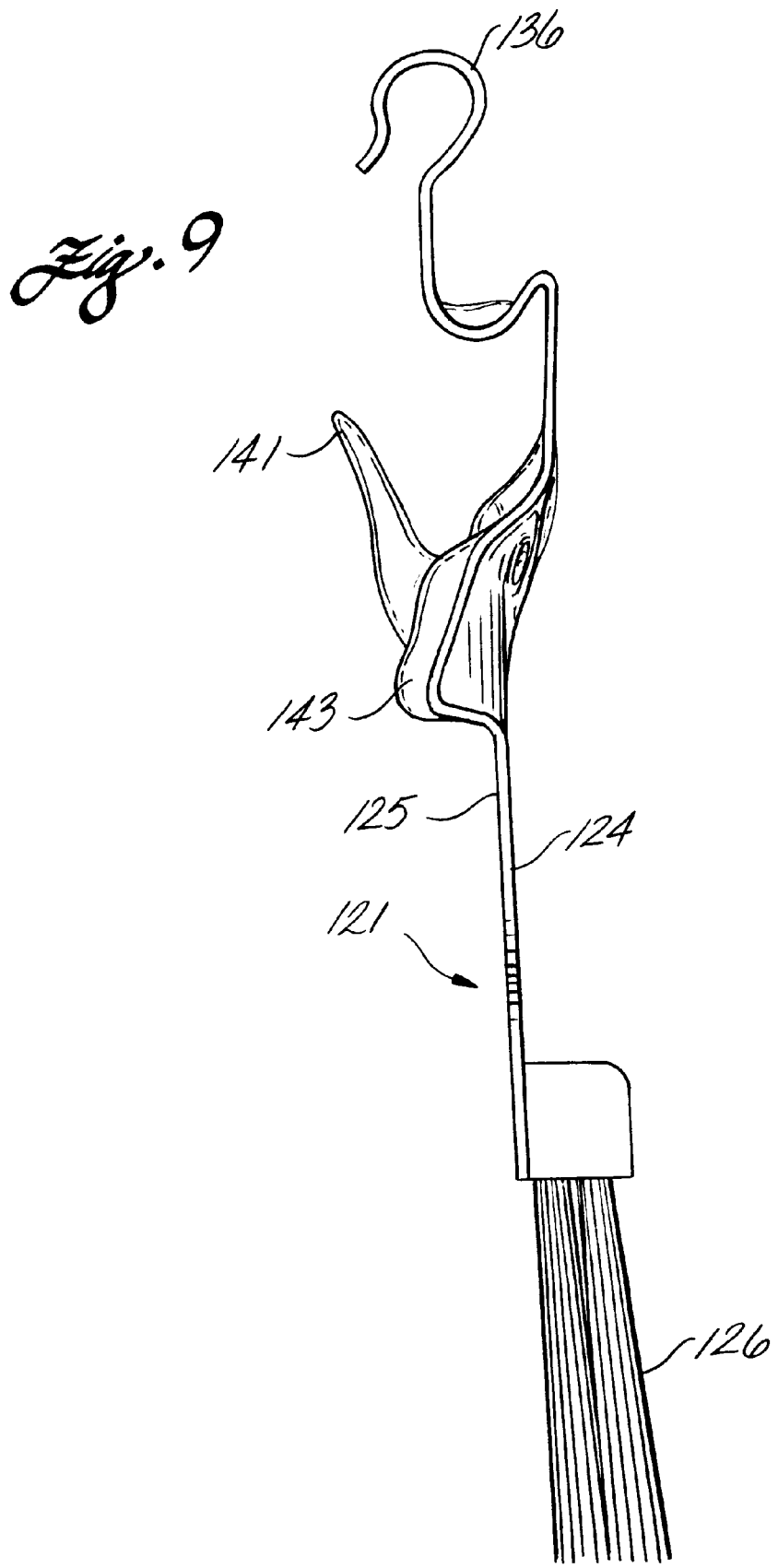

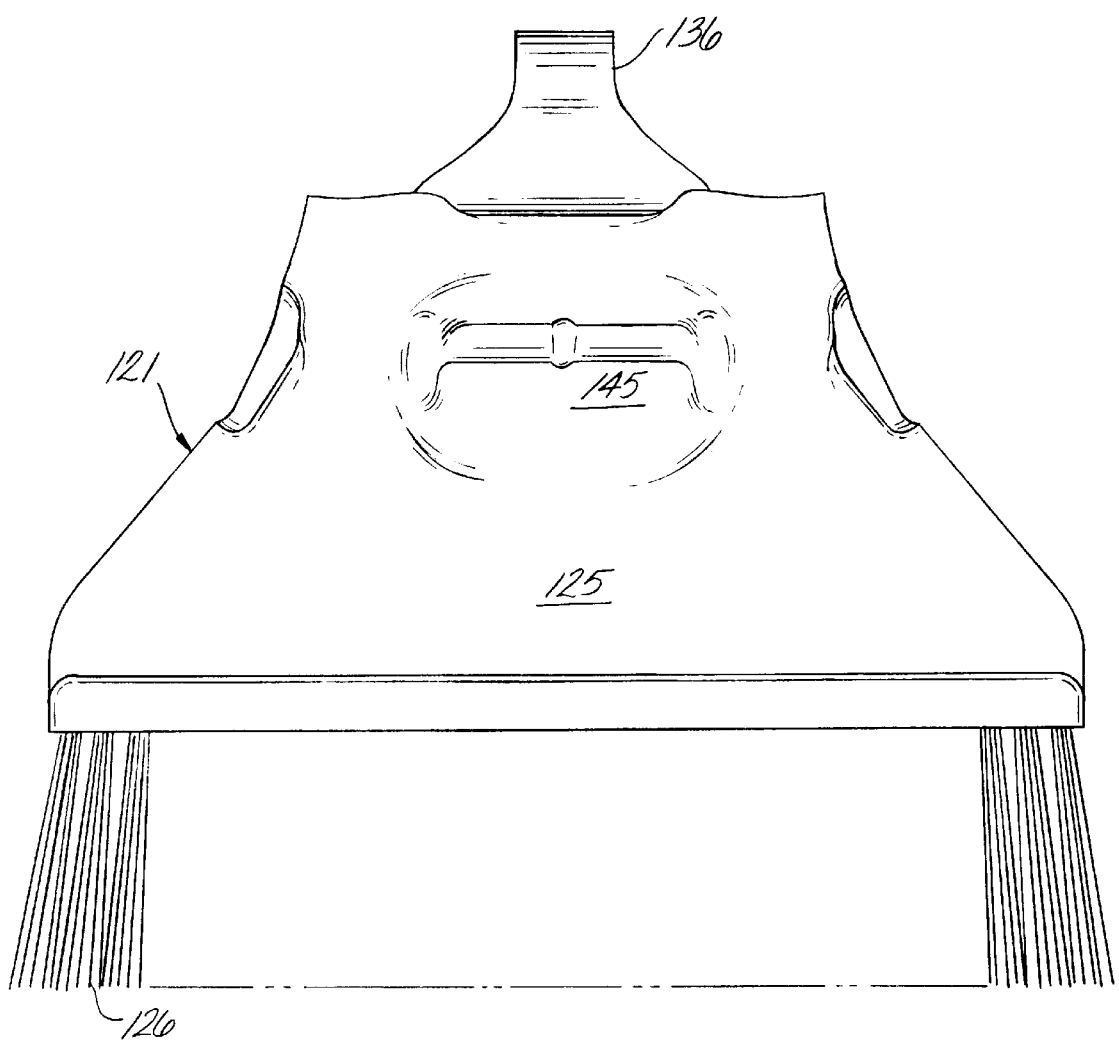

GARDENING TOOL

CROSS-REFERENCE TO RELATED APPLICATIONS

This application claims priority of provisional patent Application Ser. No. 60/026,339 filed Sep. 19, 1996.

FIELD OF THE INVENTION

This invention relates to lawn and garden tools, and more particularly to a detachable broom head that can be removably mounted to most commonly used lawn and garden rakes.

BACKGROUND

Lawn and garden tools that include a combination of a rake and broom are known in the art. Horkey, U.S. Pat. No. 3,668,850 and Lutz, U.S. Pat., No. 3,885,765, for example disclose lawn and garden tools that can be used as both a rake and a broom. While disclosing the general idea of broom and rake combinations, these prior art lawn and garden tools are unnecessarily cumbersome to use as a result of their relatively complicated designs.

Horkey discloses a rake fastened to a broom by a slidable shaft. However, in order to convert between the raking and brooming features of the tool, it is first necessary to move a latch located within the tool handle. This design, therefore, is not very efficient for a gardener requiring both features of this tool. For example, in order to switch between the raking and brooming features of this lawn and garden tool, a gardener would first have to stop raking, move the latch into the brooming position, and then begin to use the broom. In order to return to raking, the same process would have to be completed in reverse. Moreover, the broom bristles in Horkey's lawn and garden tool are not sufficiently angled away from the rake tines. This aspect of the design would require the gardener to hold the tool in such a way that it is substantially perpendicular to the ground to avoid interference with the bristles when using the rake. In short, the design of this broom and rake combination sacrifices the true functionality of both the broom and the rake.

Lutz also discloses a relatively complicated lawn and garden tool which can be converted between a wide and narrow rake. Although referred to as a broom, the narrow rake simply does not have the soft, dense bristles necessary to adequately function as a broom. The narrow rake, for example, would not be able to satisfactorily sweep fine debris such as dirt and small leaves. Furthermore, like the tool disclosed by Horkey, this design also requires the gardener to stop using the tool in order to convert between the wide and narrow settings, resulting in an inefficient loss of time.

Consequently, there exists a need for a simple, efficient, easy to use lawn and garden tool that can function both as a rake and as a broom.

SUMMARY OF THE INVENTION

The present invention, therefore, provides a detachable broom head that can easily be removably mounted to most commonly used lawn and garden rakes. The detachable broom head allows a gardener to use a single lawn and garden tool for tasks that require both raking and brooming. The unique, yet simple, design of the detachable broom head makes it possible to switch between raking and brooming by merely rotating the rake handle 1800. The broom head is attached to the upper face of the rake frame in such a manner that a dual purpose lawn and garden tool is created. In one orientation, the tool functions as an ordinary rake. By merely flipping the tool over so that the broom bristles face the ground, the same tool can function effectively as a broom. Moreover, unlike the prior art, when the brooming feature is no longer required, the broom head can be detached from the rake and conveniently stored until needed.

The broom head may be quickly and easily attached and detached from the rake. In one embodiment, the attachment means comprise a pair of flexible attachment clips. The attachment clips help grip the rake frame. The attachment clips contain a rib-engaging recess corresponding to a rib located on the upper face of the frame of the rake. In the presently preferred embodiment, the profile of the broom head is generally contoured to help assist in engaging the rake frame. Therefore, the broom head easily slides over the rake frame, and is locked into place when the rib on the upper surface of the rake frame is engaged. Additionally, finger tabs are provided on the attachment clips to help disengage the recesses from the rib in order to remove the broom head from the rake.

In another embodiment, the attachment means comprise a coupler that can be attached to the rake, for receiving the broom head. Preferably, the coupler includes a spring and an axle section. The lower surface of the broom head is contoured to engage the coupler. A plurality of flanges extending outwardly from the lower surface of the broom head engage the spring and axle sections of the coupling device, locking the broom head on the rake.

BRIEF DESCRIPTION OF THE DRAWINGS

These and other features and advantages of the present invention will be appreciated as the same become better understood by reference to the following Detailed Description of the Invention when considered in connection with the accompanying drawings, wherein:

FIG. 9 is a side of the broom head of FIG. 6 without the coupling;

FIG. 10 is a top view of the upper surface of the broom head of FIG. 6.

DETAILED DESCRIPTION OF THE INVENTION

The improved lawn and garden tool according to the present invention comprises a detachable broom head that can be removably mounted to most commonly used lawn and garden rakes.

Figure 1:
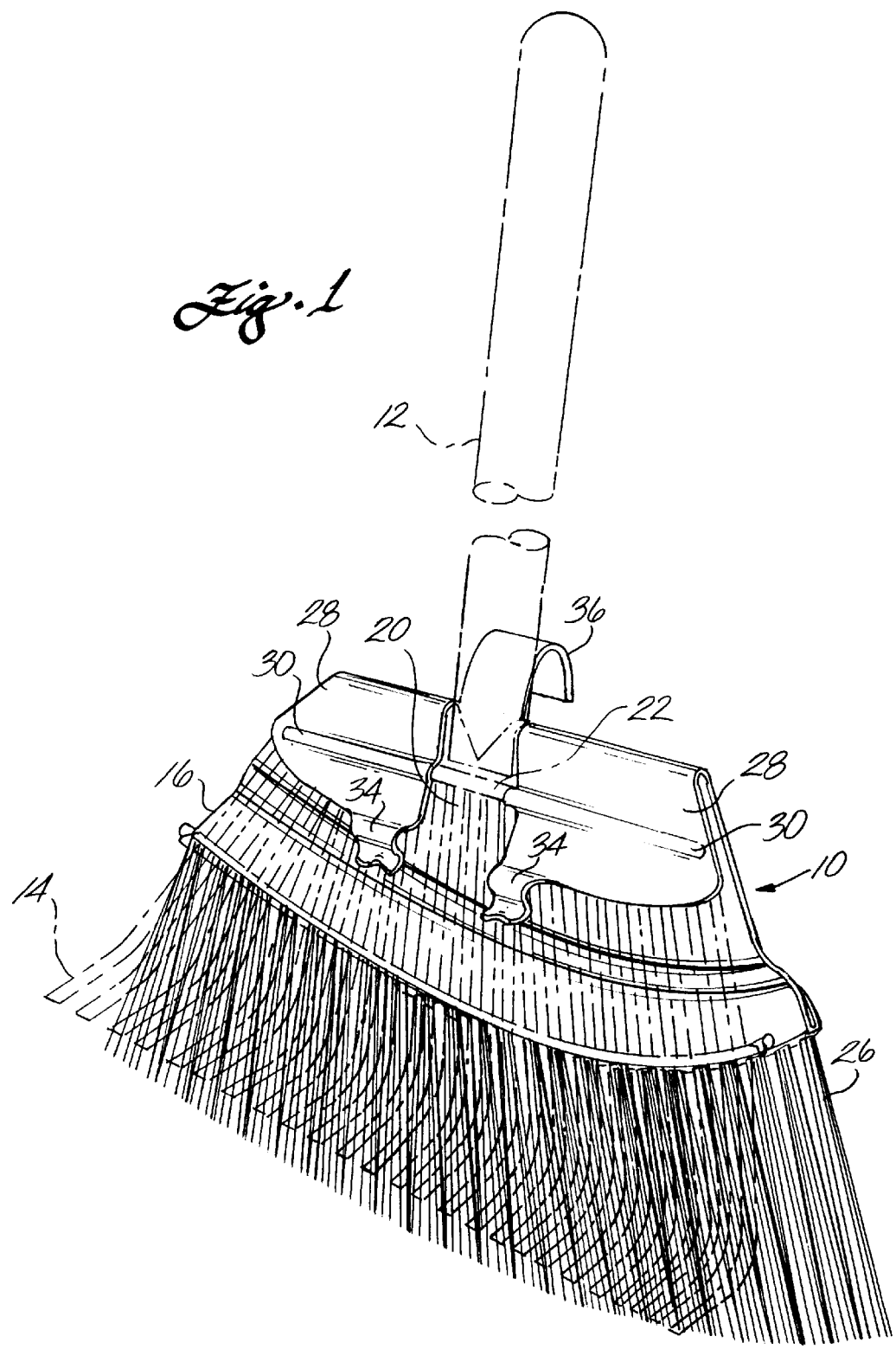
FIG. 1 is a perspective view of a broom head according to the present invention attached to a lawn and garden rake.

In one embodiment of the invention shown in FIG. 1, the detachable broom head 10 is designed to easily slide onto various lawn and garden rakes 12, such as the gardening rake sold by Cal-Flex Flexrake Corp under the mark FLEXRAKE®. The rake has a set of flexible tines 14 extending outwardly from the frame 16 of the rake. The frame has an upper face (not shown and a lower face 20. The tines 14 are angled toward the lower face 20 of the frame. A rib 22, extending the width of the frame, is present on both the upper and lower 20 faces, adjacent to the tines.

The broom head 10 comprises a frame 21 having an upper surface 24 and lower surface 25, a plurality of bristles 26 attached to, and extending outwardly from, the upper surface 24, and a means for attaching the broom head 10 to the rake 12. In the embodiment shown in FIGS. 1–5 the means for attaching the broom head 10 to the rake 12 includes a pair of flexible attachment clips 28 that grip the lower face 18 of the frame of the rake, securing the broom head onto the rake. The attachment clips 28 are integrally formed with the frame 21 of the broom head, and extend downwardly from the upper surface 24 at such an angle that the profile of the broom head is essentially an inverted 'V' or 'U' shape. The attachment clips are contoured for a snug fit over the rake frame. To assist in gripping the upper face of the frame of the rake, a rib-engaging recess 30 extends across the width of each attachment clip for cooperatively engaging the rib 22 on the lower face 20 of the rake frame. If desired, a similar recess 32 may be added to the upper surface 24 of the broom head to engage the rib 22 on the upper face 20 of the rake frame, thereby further securing the broom head to the rake.

To aid in removal of the broom head from the rake frame, each attachment clip further includes an angled finger tab 34 extending outwardly from the bottom of the clip. The finger tabs 34 preferably contain curved indentations and are of a width adapted to allow a user to easily pull on the finger tabs, disengaging the recesses from the rib on the lower face of the rake frame as is necessary to remove the broom head. Once the rib has been disengaged, the broom head will easily slide off the rake frame.

In addition, a hook or U-shaped handle 36 may be provided on the broom head, centered along the width of the frame 21 of the broom head, directed opposite the attachment clips. The handle 36 may be used for various purposes, such as pulling the broom head away from the rake frame during detachment, hanging the broom head during storage (e.g. in a garage or storage shed; on a gardener's person when not currently needed, etc.), or as an additional means for attaching the broom head to the rake frame, via a handle clip (not shown) on the rake shaft, or like means.

The attachment means is made out of plastic, or some other material that is rigid, yet flexible enough to snugly attach to the rake frame. Except for the bristles, the entire broom head may be integrally formed. The bristles may be attached to broom head by fasteners or any other means well known in the art.

Figure 2:
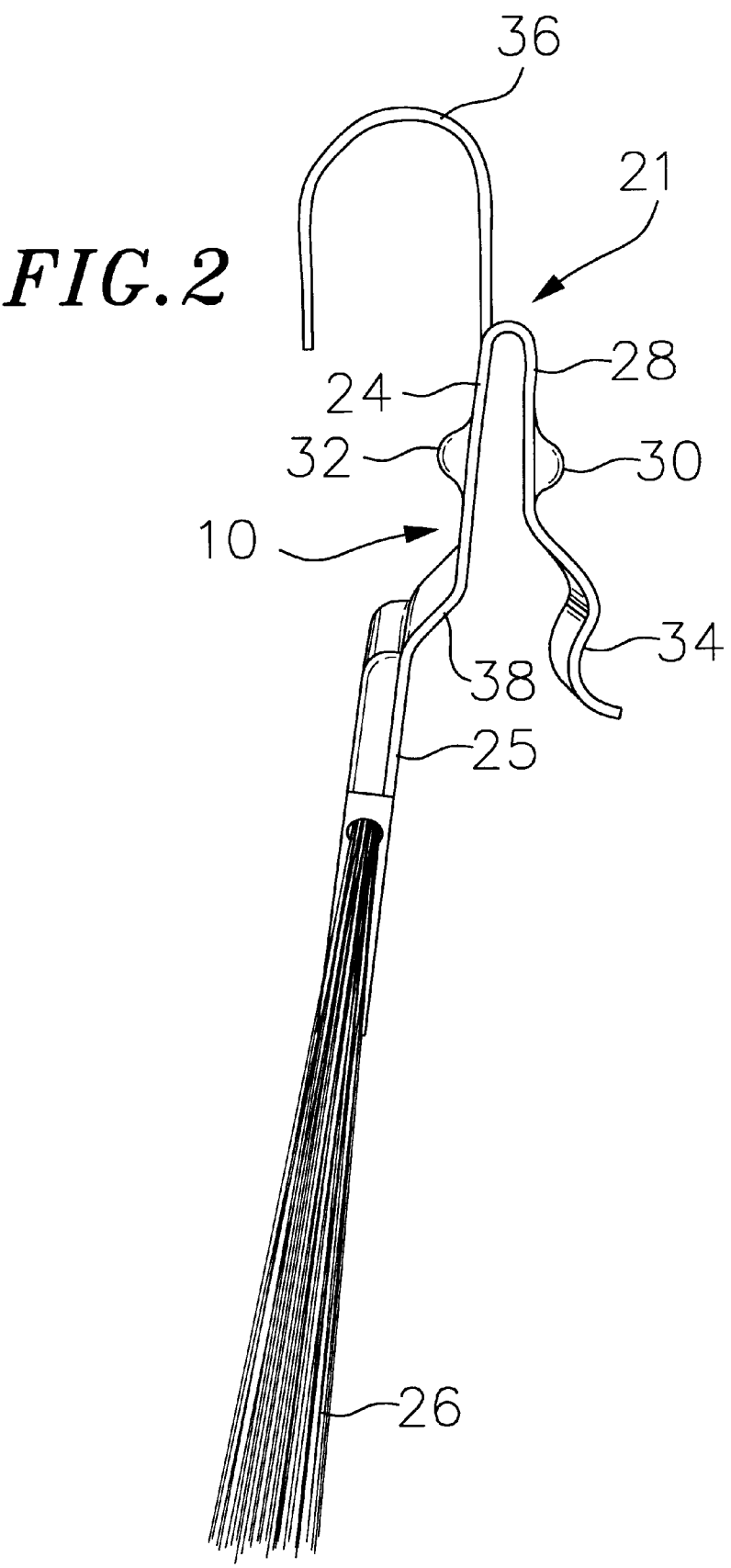
FIG. 2 is a side view of the broom head of FIG. 1.
Figure 3:
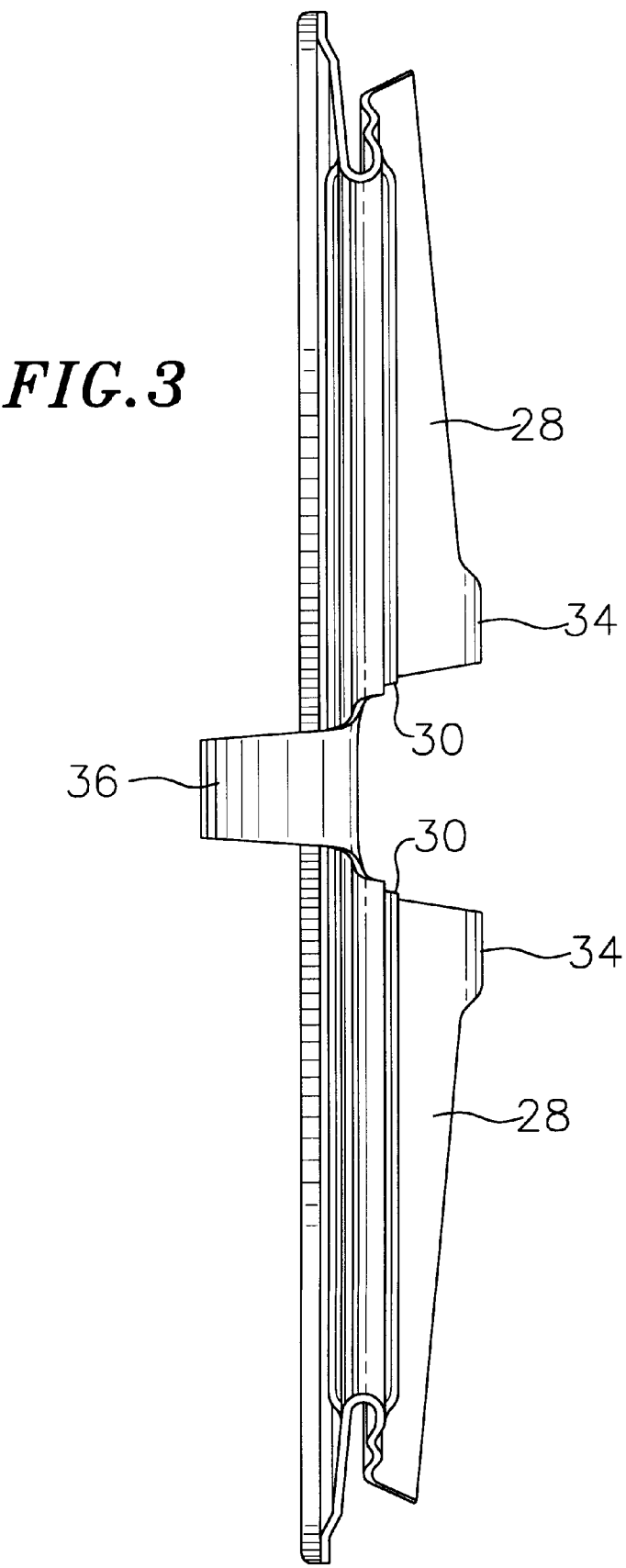
FIG. 3 is a top view of the broom head of FIG. 2.
Figure 4:
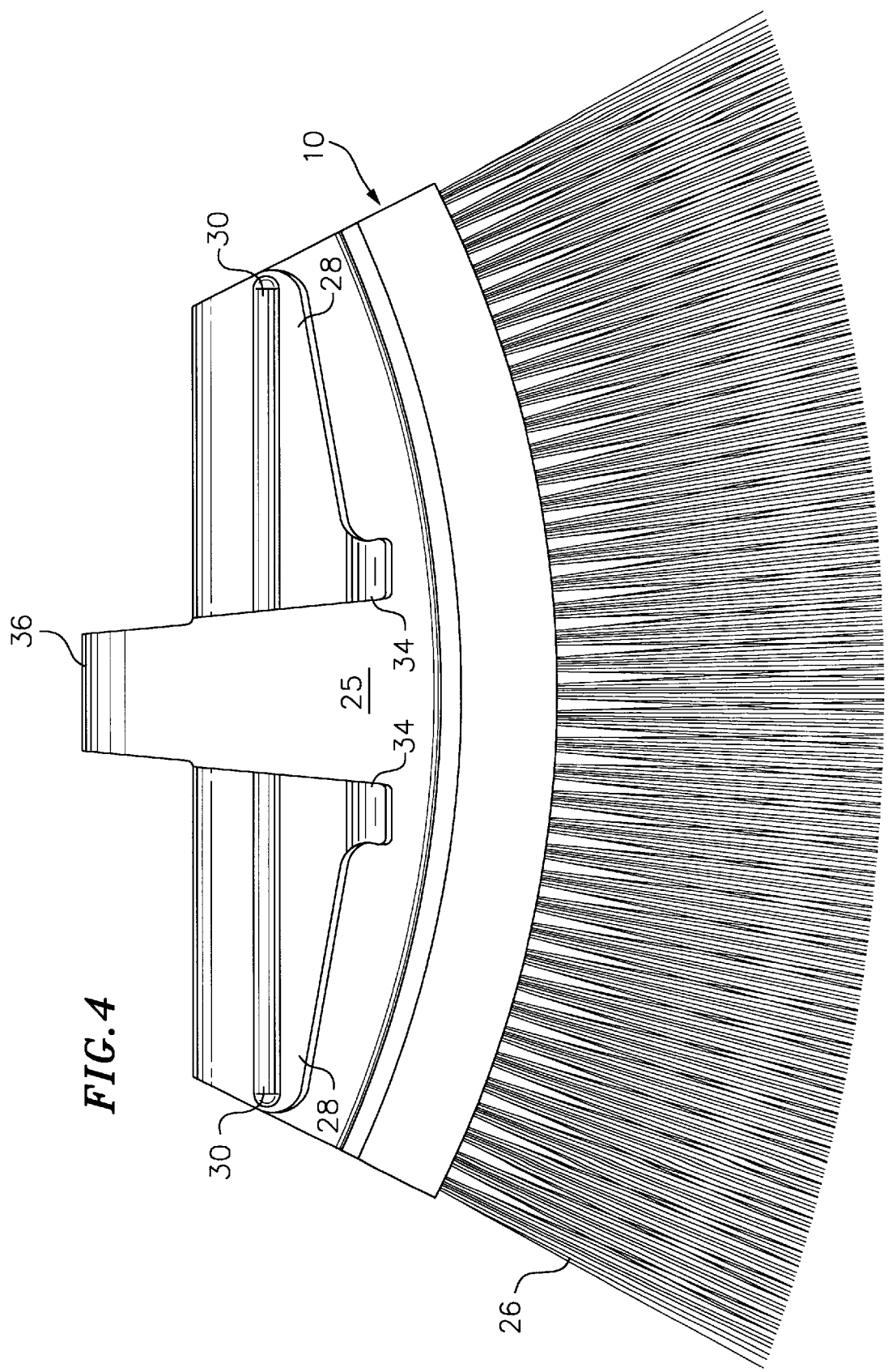
FIG. 4 is a top view of the attachment clips of the broom head of FIG. 2.
Figure 5:
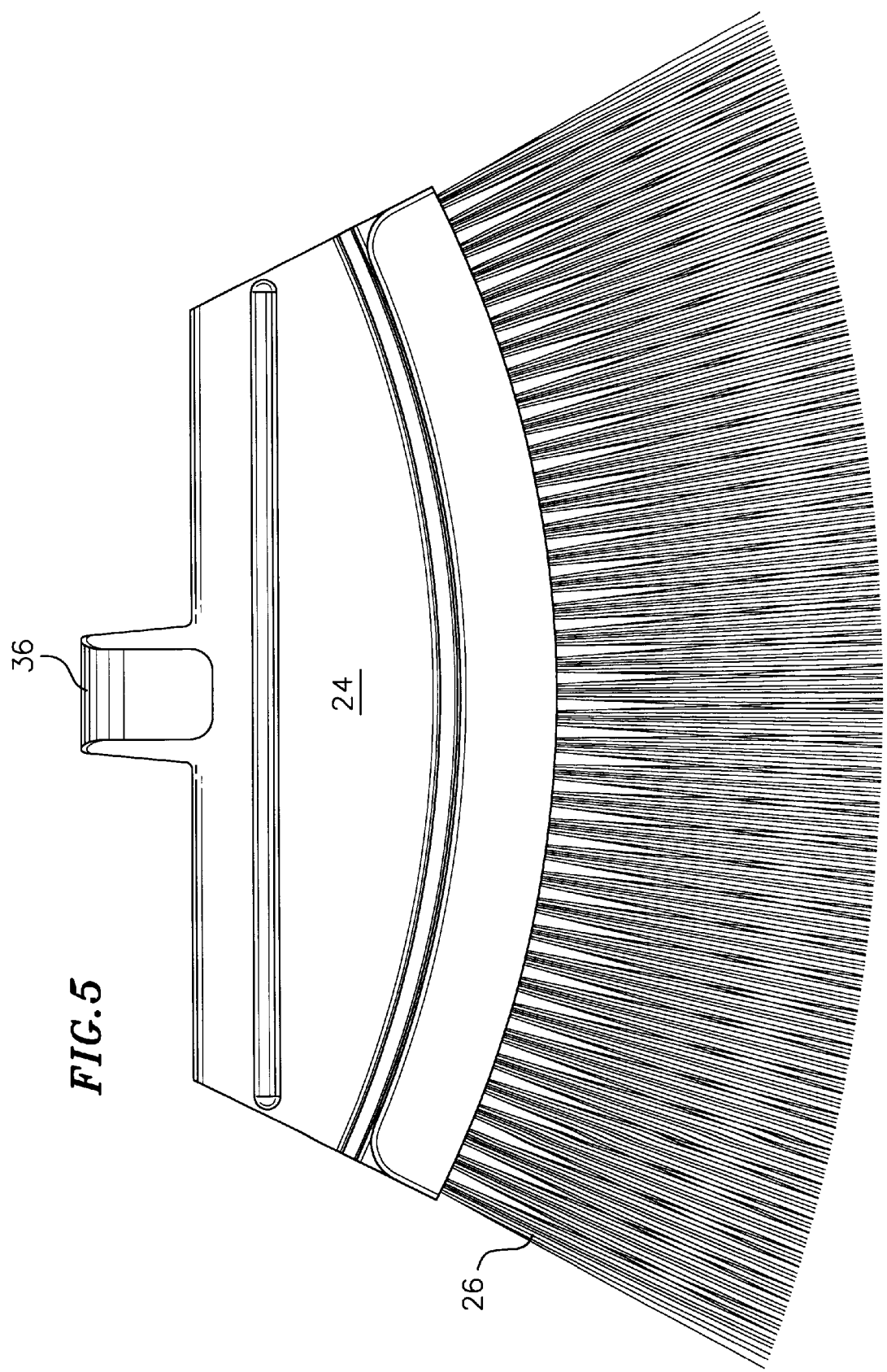
FIG. 5 is a top view of the upper surface of the broom head of FIG. 2.
Figure 6:
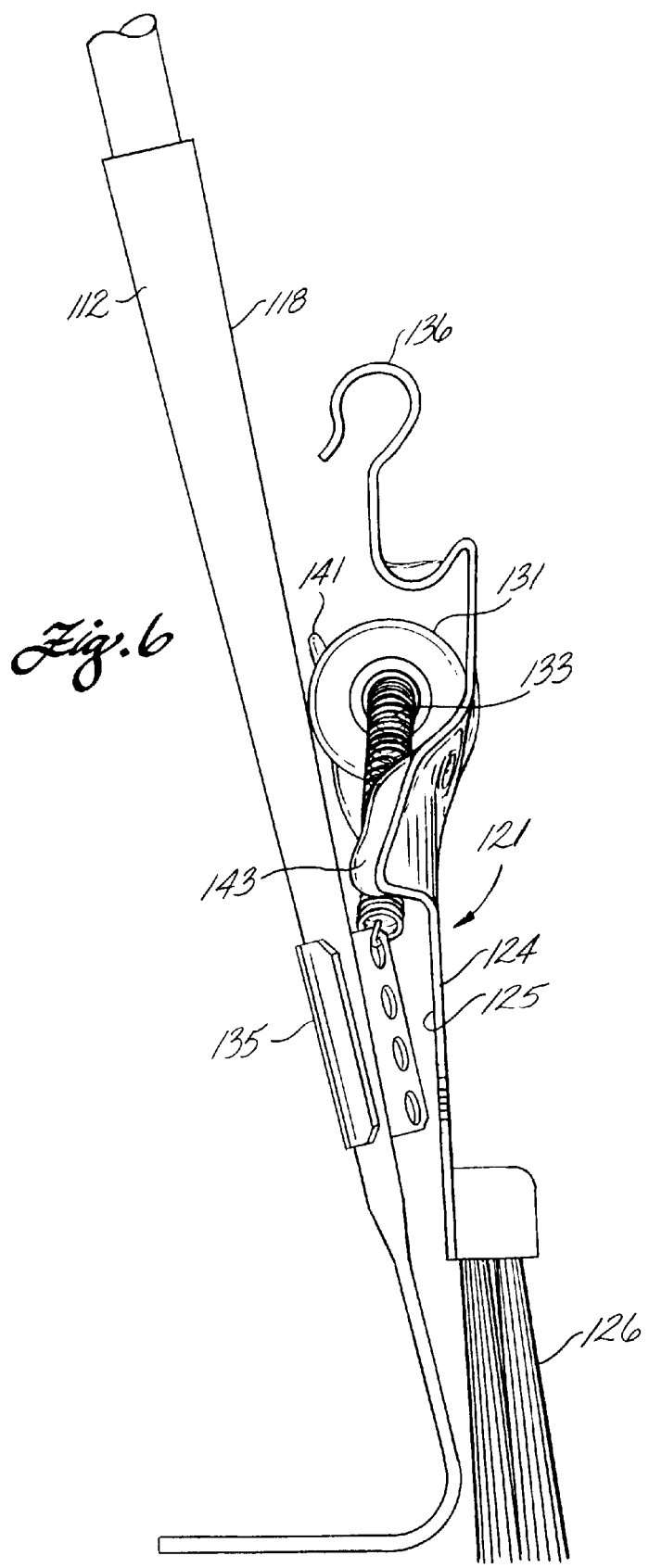
FIG. 6 is a side view of an alternative embodiment of a broom head according to the present invention attached to a lawn and garden rake.
Figure 7:
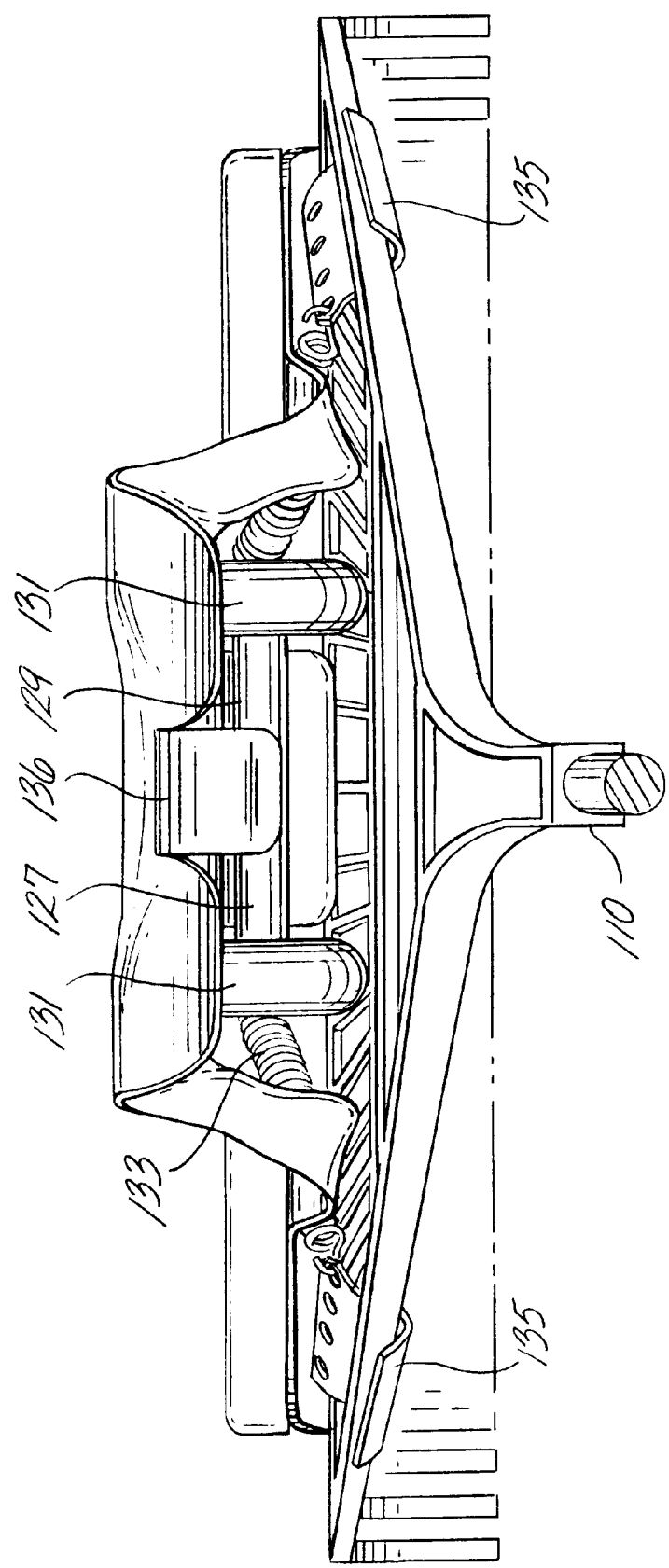
FIG. 7 is a top view of the broom head of FIG. 6 attached to a lawn and garden rake.

The distribution of the broom bristles 26 is such that the width of the broom bristles corresponds to that of the rake tines 18 for easy sweeping of gutters and the like. The bristles 26 are also designed to have a length that extends past the bend in the rake tines, but as can be seen in FIG. 2, at such an angle that the bristles and tines will not interfere with one another during either raking or sweeping operations, respectively. FIG. 2 also illustrates the use of a step 38 near the bottom of the upper surface 24 of the broom head to further ensure that the bristles do not interfere with the rake tines, both during use of the tool and during attachment and detachment of the broom head. It should be understood that a variety of different types of bristles as well known in the art can be used with the present invention. The bristles can be fine, coarse, or a combination of both depending on the particular surface or debris being swept.

This design allows for simple and easy attachment and detachment of the broom head to the rake frame. In order to attach the broom head to the rake, the broom head is simply slid over the rake frame until the rib on the lower face 20 of the rake frame engages the recesses in the attachment clips 28. In order to keep the bristles away from the tines, it is important to make sure that the attachment clips are placed on the lower face of the rake frame, and not the upper face. Due to the profile of the broom head, the attachment process if essentially self-guiding. In order to detach the broom head from the rake, it is simply necessary to pull outwardly on the finger tabs 34 (i.e. away from the rake). This will disengage the rib from the recesses and allow the broom head to be separated from the rake frame by pulling on the U-shaped handle.

While this embodiment was illustrated using a FLEXRAKE® brand rake, the broom head attachment clips can be readily adapted to a variety of different rakes based on the particular design and location of the rib on the frame of the rake. Likewise, while a rib was used to illustrate the means of attachment to the rake, it should be understood that this embodiment can be adapted to accommodate any rib-like member. Moreover, it should be readily apparent that the recess in the attachment clips could be replaced by a rib or rib-like member to engage a recess present on the rake frame.

An alternate embodiment of the present invention is shown in FIGS. 6–10. Where the attachment means of the previous embodiment depended primarily on the presence of a rib or rib-like member on the rake frame, this embodiment provides a means of attaching the broom head to the rake that can be employed with most commonly used lawn and garden rakes, whether or not the frame contains a rib for attachment.

The broom head 112 comprises a frame 121 having an upper 124 and lower 125 surface, a plurality of bristles 126 attached to, and extending outwardly from, the upper surface 124, and a means for attaching the broom head to the rake. In this embodiment, the means for attaching the broom head to the rake includes a coupling device 127 that can be attached to the upper face 118 of the rake frame. While lawn and garden rakes come in different shapes and sizes, the use of the coupling device will allow the broom head according to the present invention to be attached to most any design.

The coupling device 127 comprises a hollow dumbbell shaped component, formed of a hollow axle 129 and a pair of rollers 131 having a hollow center for receiving the axle. One roller is attached to each end of the axle 129, thereby creating the dumbbell shape. A spring 133 is passed through the axle and rollers. Clips 135 are positioned in the outermost slots of rake 110 in order to attach the coupler 127 to the rake 110. The ends of the spring 133 are attached to clips 135 through holes in the end of the clips, positioning the coupler 127 on the upper face 118 of the rake as show in FIG. 7.

As illustrated, it is preferred that clips 135 contain multiple holes along the width of the clip so that the coupler may be positioned at various heights along the upper face of the rake, as dictated by the design of the rake. This allows the broom head to be positioned at various heights along the upper face of the rake, so that variations in design would not affect the functionality of the broom head. Moreover, for some rake designs, particularly metal garden rakes, it may not be necessary to use the clips as the ends of the spring could be attached directly to the frame of the rake.

Likewise, although a spring 133 is described to attach the coupler to the rake, it is to be understood that other materials may also be used without affecting the functionality of the broom head. For example, a rubber or bungi-type material could be used in place of the spring if safety concerns dictate. Likewise, any material with sufficient elasticity may be used. Moreover, other coupling devices could be used to attach the broom head to the rake, without departing from the inventive concepts disclosed herein.

Figure 8:
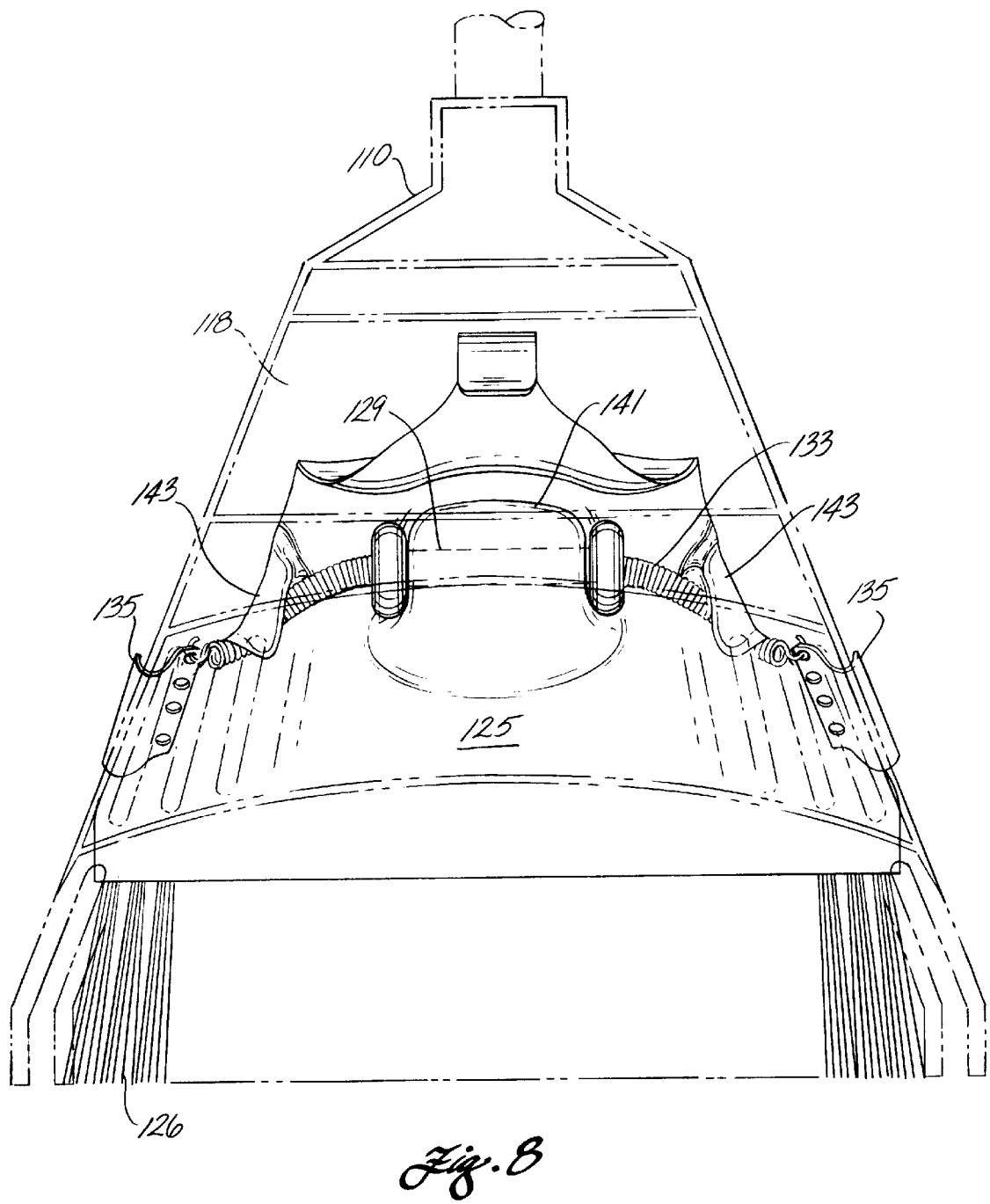
FIG. 8 is a back view of a lawn and garden rake with the broom head of FIG. 6 attached, with a portion of the rake removed.

The lower surface 125 of the broom head frame, as shown in FIG. 8, is designed to receive and engage the coupler 127. This is accomplished primarily by the presence of three flanges, or protrusions, extending outwardly from the lower surface 135 of the broom head frame.

A center flange 141, is located near the center of the lower surface of the broom head frame, protruding outwardly and at an angle, in the direction opposite the bristles 126. The center flange engages the axle 129 of the coupler during operation, and therefore the inside surface of the center flange may be shaped to form a groove for receiving the axle. Similarly, a pair of grooves may be formed in the lower surface 125 of the broom head frame, adjacent the center flange, for receiving the rollers of the coupler. The width of the center flange 141 is preferably slightly less than the width of the axle 129, and the length of the center flange is preferably to prevent the coupler 127 from accidentally disengaging from the rake during use.

Two side flanges 143 are also located on the lower surface 125 of the frame, one on each side of the broom head, protruding toward the center of the broom head. The side flanges engage the spring 133 during operation, and therefore the inner surfaces of the side flanges may be grooved to receive the spring. The length of the side flanges 143 is preferably such that when attached, a portion of the spring 133 extends over the top of each side flange. Due to the position of the spring during attachment, the upper portion of the side flanges preferably extends out farther than the lower portion, in order to secure the broom head to the rake.

In addition, a recess 145 may be provided in the upper surface of the broom head to act as a hand grip during attachment and detachment of the broom head. It is recommended that while attaching and detaching the broom head, the rake be held vertically so that the ground may be used for leverage.

In order to attach the broom head 112 to the rake 110, it is recommended that the coupler 127 first be attached to the rake. The coupler 127 can be attached to the rake as previously described using clips 135. Once the coupler has been attached to the rake, it is possible to attach the broom head to the coupler. The broom head is positioned over the coupler so that the shaft 129 is located between the center flange 141 and the lower surface 125 of the broom head frame. Then the broom head is pulled down, using hand grip 145, so that the spring is placed in tension. The broom head is be pulled down until both side flanges 143 clear the spring 133. Once the side flanges clear the spring, the hand grip 145 may be slowly released. The tension in the spring tends to pull the broom head up to a position where the combination of the flanges and the tension in the spring secure the broom handle to the rake, as shown in FIG. 12.

When desired, it is possible to detach the broom head from the rake. To detach the broom head it is recommended to first pull the broom head down away from the tines of the rake, again using the hand grip 145. While pulling down, the broom head is preferably slowly rotated so that the bristles 126 begin to move away from the rake tines 114. Rotating the broom head will help disengage the spring 133 from the side flanges 143. Once the springs have been disengaged from the side flanges, the broom head can be easily removed from the rake by lifting the broom head off of the coupler 127. Then, the coupler can be removed from the rake. Alternately, if desired, the coupler can remain on the rake as it does not interfere with the operation. This will allow the broom head to be quickly attached to the rake when needed again.

As described in connection with the previous embodiment, if desired, a hook or U-shaped handle 136 may be attached to the broom head to assist storage of the broom head.

Both embodiments described provide a simple, efficient, and easy to use detachable broom head that can transform an ordinary lawn and garden rake into a tool that can function both as a rake and as a broom. Once the broom head has been attached, the user can quickly and easily switch between the raking and brooming features of the tool, as each task requires. The tool can be used as an ordinary rake, since the bristles of the broom head do not interfere with the rake tines. When the brooming feature is needed, the rake handle can be rotated 180° so that the bristles are ready to use, for example, in sweeping up dirt or fine debris. Moreover, when the brooming feature is no longer required, the broom head can be removed and conveniently stored until needed again.

While various embodiments of this invention have been shown and described, it would be apparent to those skilled in the art that many more modifications are possible without departing from the inventive concepts herein. It is, therefore, to be understood that within the scope of the appended claims, this invention may be practiced otherwise than as specifically described.

What is claimed is:

1. A broom head adapted to be removably mounted on a gardening rake, the broom head comprising:
   a frame having a surface;
   a plurality of bristles attached to and extending outwardly from the broom head frame; and
   means for attaching the broom head to the rake without screws such that the bristles do not interfere with the operation of the rake and such that the rake may be converted into a broom by turning the rake over so the bristles are adjacent to, and in contact with, a surface that requires sweeping.

2. The broom head according to claim 1 wherein the attachment means comprise a pair of attachment clips integral with and extending from the surface of the broom head frame, wherein a recess extends substantially across the width of each attachment clip for cooperatively engaging a first rib member located on the rake when the broom head is attached to the rake.

3. The broom head according to claim 2 wherein the attachment means further comprise a recess extending substantially across the width of the broom head frame for cooperatively engaging a second rib member located on the rake when the broom head is attached to the rake.

4. The broom head according to claim 3 wherein the attachment clips include an angled finger tab extending outwardly from each attachment clip, said finger tabs assisting in the removal of the broom head from the rake by disengaging the first rib member from the recess when pulled away from the rake.

5. The broom head according to claim 4 further comprising a hook attached to the broom head frame, opposite the bristles, to aid in storing the broom head and removing the broom head from the rake.

6. The broom head according to claim 5 wherein the surface of the broom head frame includes a step away from the rake, near the bristles, to ensure that the bristles do not interfere with the rake during operation.

7. The broom head according to claim 1 wherein the attachment means comprise a coupler adapted to be connected to the rake to receive the broom head.

8. A broom head adapted to be removably mounted on a gardening rake, the broom head comprising:

a frame having a surface;

a plurality of bristles attached to and extending outwardly from of the broom head frame; and a pair of flexible attachment clips attached to the frame for securing the broom head to the rake, wherein a recess extends substantially across the width of each attachment clip for cooperatively engaging a first rib member located on the rake when the broom head is attached to the rake, and wherein a finger tab extends outwardly from each attachment clip to assist in the removal of the broom head from the rake by disengaging the first rib member from the recess when pulled away from the rake.

9. The broom head according to claim 8 wherein the attachment clips extend from the surface of the frame.

10. The broom head according to claim 9 wherein a recess extends substantially across the width of the broom head frame for cooperatively engaging a second rib member located on the rake to further secure the broom head to the rake.

11. The broom head according to claim 10 further comprising a hook attached to the broom head frame, opposite the bristles, to aid in storing the broom head and removing the broom head from the rake.

12. The broom head according to claim 11 wherein the surface of the broom head frame includes a step away from the rake, near the bristles, to ensure that the bristles do not interfere with the rake during operation.

13. An improved gardening tool comprising:

a rake having a rake frame and a plurality of tines extending from the rake frame, wherein the rake frame includes a rake frame surface adjacent the tines and an elongated rib member on the rake frame surface extending substantially perpendicular to the tines, and wherein at least a portion of the tines extend substantially parallel to the rake frame surface;

a broom head comprising a broom frame having a broom frame surface and a plurality of bristles extending from the broom frame substantially parallel to the broom frame surface; and a flexible attachment member frictionally securing the broom head to the rake frame such that the bristles of the broom head do not substantially interfere with the tines of the rake, the attachment member comprising a recess for cooperatively engaging the rib member.

14. The gardening tool of claim 13 wherein the attachment member comprises a flexible clip that extends from the broom frame surface.

15. The gardening tool of claim 12 wherein the attachment member further comprises an attachment member surface having a step away from the rake frame to ensure that the bristles of the broom head do not substantially interfere with the tines of the rake during operation.

16. An improved gardening tool comprising:

a rake having a rake frame and a plurality of tines extending from the rake frame, wherein the rake frame includes a rake frame surface adjacent the tines and a rib member on the rake frame surface;

a broom head comprising a broom frame having a broom frame surface and a plurality of bristles extending from the broom frame surface substantially parallel to the broom frame surface; and a flexible attachment member frictionally securing the broom head to the rake frame such that the bristles of the broom head do not substantially interfere with the tines of the rake, wherein the attachment member further comprises a tab member for facilitating detachment of the broom head from the rake.

* * * * *